United States Patent

Costley

[11] Patent Number: 5,305,673
[45] Date of Patent: Apr. 26, 1994

[54] DUAL BLADE BAND SAW

[76] Inventor: Donald E. Costley, 6425 Tolhurst Ct., Anchorage, Ak. 99504

[21] Appl. No.: 81,097

[22] Filed: Jun. 25, 1993

[51] Int. Cl.⁵ ..................... B23D 55/06; B27B 13/00
[52] U.S. Cl. ........................... 83/802; 83/788; 83/808; 83/816; 83/820; 83/859; 474/114
[58] Field of Search ............... 83/72, 520, 661, 701, 83/788, 795, 803, 802, 808, 814, 816, 820, 859, 860; 474/113, 114

[56] References Cited

U.S. PATENT DOCUMENTS

| | | | |
|---|---|---|---|
| 257,918 | 5/1882 | Bowker | 83/808 X |
| 357,681 | 2/1887 | Maxwell . | |
| 448,659 | 3/1891 | Markham | 83/808 |
| 919,556 | 4/1909 | Dittbenner . | |
| 2,347,765 | 5/1944 | Boice et al. | 83/860 |
| 2,467,532 | 4/1949 | Lasar | 83/788 X |
| 2,827,085 | 3/1958 | Ocenasak | 83/814 |
| 3,780,609 | 12/1973 | Storti | 83/808 X |
| 3,968,715 | 7/1976 | Cleland | 83/788 X |
| 4,146,945 | 4/1979 | Hotard | 83/803 X |
| 4,333,370 | 6/1982 | Sack | 83/56 |
| 4,557,168 | 12/1985 | Tokiwa | 83/56 |
| 4,624,167 | 11/1986 | Stefanic | 83/802 |
| 4,700,597 | 10/1987 | Taguchi | 83/72 X |
| 4,893,533 | 1/1990 | Harris | 83/13 |
| 4,960,026 | 10/1990 | Terpstra | 83/816 X |

FOREIGN PATENT DOCUMENTS

| | | | |
|---|---|---|---|
| 22430 | 4/1948 | Finland | 83/808 |
| 21387 | 9/1912 | United Kingdom . | |

*Primary Examiner*—Eugenia Jones
*Attorney, Agent, or Firm*—Richard C. Litman

[57] ABSTRACT

A dual blade band saw cutting machine which allows two individuals to work on two different objects at two separate work stations within the same machine. Through the utilization of a single variable speed motor and two overlapping triangular rotational patterns, two safe and independent work stations with large working areas, each having its own cutting band, are provided. Additional features of the cutting machine include assemblies for adjusting the tension of the cutting bands, an assembly for varying the speed of the motor, and a display for informing the individuals operating the cutting machine of the rotational speed of the cutting bands in blade feet per minute.

12 Claims, 3 Drawing Sheets

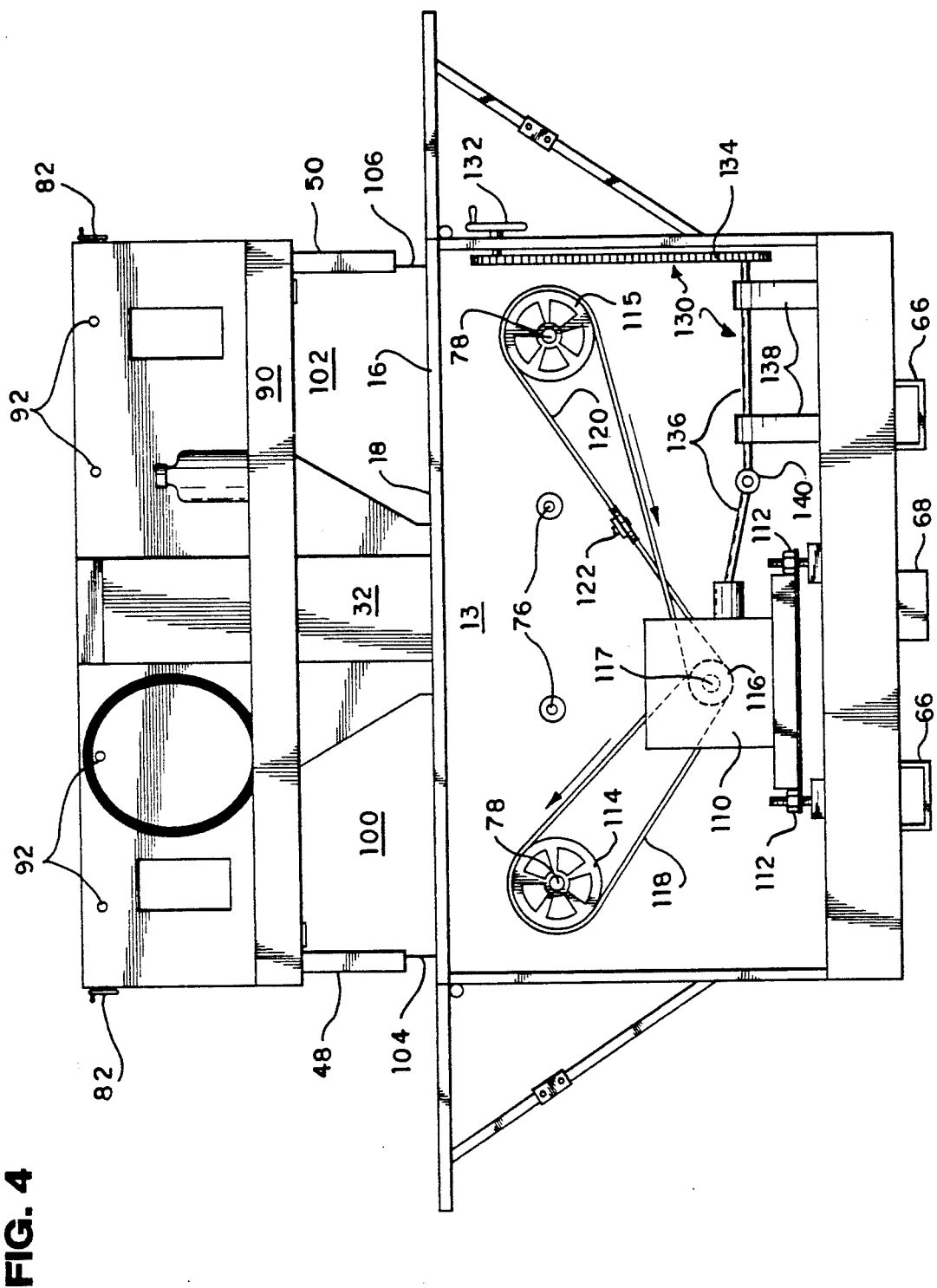

DUAL BLADE BAND SAW

BACKGROUND OF THE INVENTION

1. Field of the Invention

The present invention relates to band saws utilized in cutting sheet metal and the like. Specifically, the present invention relates to a machine having dual band saws powered by a single variable speed motor.

2. Description of the Prior Art

Band saws for cutting wood, metal, and other suitable objects appear in the patent record since the early 1880's. However, very few dual band saws have been patented since that time. Furthermore, very few band saws provide a large enough throat area so that the material being cut does not have to constantly be removed and repositioned. Band saws with two separate work stations and utilizing two independent cutting bands powered by a single variable speed power source were not seen in the prior art. These features, as well as others related to band saws, have been patented individually in prior patents. However, the combination of these features into a single dual band saw has not been accomplished prior to the present invention. The following patents present band saws and band saw apparatus that show some of the individual aspects and features mentioned above.

U.S. Pat. No. 357,681, issued on Feb. 15, 1887 to Joseph W. Maxwell, discloses a dual band saw for cutting an object, at a predetermined and variable angle, with respect to the vertical, to cut a piece of wood into a desired shape, wherein the shape may be curved, intricate, or otherwise irregular. Although, this band saw is seen as having two four wheeled band saw blades incorporated therein, the blades are configured to work on the same piece of material. Thus, the out-of-plane, essentially one-behind-the-other configuration of the blades is used to position the blades close enough so that they may work on the same object.

U.S. Pat. No. 4,146,945, issued on Apr. 3, 1979 to Septime R. Hotard, also discloses a band saw having a four wheel configuration. Hotard's band saw utilizes a horizontally positioned blade driving about four equal sized wheels in a square configuration, the band saw being capable of a vertical displacement of the entire blade assembly.

U.S. Pat. No. 4,333,370 issued on Jun. 8, 1982 to Ernst Th. Sack, discloses a band saw apparatus having three band guide rollers, or wheels, in an equilateral triangle configuration, for cutting large cast slabs. Although Sack's band saw utilizes a triangular shape similar to the right triangle configuration used in the present invention, it is unable to accommodate two simultaneous cutting operations. In addition, Sack's apparatus is to be used in series with a number of additional cutting machines to cut the same object.

Looking now at U.S. Pat. Nos. 4,624,167 issued on Nov. 25, 1986 to Joseph M. Stephanic, and 4,557,168, issued on Dec. 10, 1985 to Toru Tokiwa, examples of first manual adjustment of a variable speed motor and second electromagnetical detection of an element on a wheel are shown. Stephanic's patent discloses means for adjusting a variable speed motor from a remote location through a series of chain and shaft linkages. However, the present invention's utilization of a universal joint in the shaft linkages allows the motor to be displaced for tensioning of the drive belts without binding and jamming the linkages. Tokiwa's band saw utilizes magnets and magnetic detection means for determining the location and adjusting the band saw blade.

U.S. Pat. No. 4,893,533, issued on Jan. 16, 1990 to Gerald R. Harris, discloses a band saw capable of cutting a number of different objects at the same time. Harris' band saw, however, accomplishes this task by employing a plurality of parallel guides capable of holding small articles needing to be cut. Not only is this saw unable to accommodate two different craftsmen, the multiple objects being cut may not be moved independently with respect to one another during the cutting process.

Lastly, U.S. Pat. No. 919,566, issued on Apr. 27, 1909 to Hermann G. Dittbenner, and British Patent Specification 21,387, issued on September 19, 1912, disclose typical two wheeled single band, band saws.

None of the above inventions and patents, taken either singly or in combination, is seen to describe the instant invention as claimed.

SUMMARY OF THE INVENTION

When utilizing space in a factory it is convenient to have single machines capable of multiple functions or multiple work stations so as to conserve and more efficiently utilize floor space within the factory. The present invention accomplishes such a task by providing a cutting machine having two band saw blades therewithin arranged in such a fashion as to provide two independent work stations powered by a single power source.

Accordingly, it is a principal object of the invention to provide a dual band saw cutting machine having two independent work stations so that two individuals may works on two different objects at the same time, each individual having access to an independent saw blade supported on a triangular rotation pattern defined by three cutting band guide wheels.

It is another object of the invention to provide such a dual band saw being powered by a single power source, a variable speed motor, output speed of which is controllable by a manual chain and shaft assembly easily accessible from the exterior housing of the machine.

It is a further object of the invention to provide manually powered gear assemblies within the cutting machine for adjusting at least one of the guide wheels within each of the triangular rotation patterns which support the cutting bands so that the tension thereon may be varied.

Still another object of the invention is to provide means for determining the speed of the blades as they are being moved about the triangular rotation pattern and displaying such in a clear and concise manner to the individual operating the machine in units of blade feet per minute.

A further object of the invention to provide a safe, well illuminated dual work station for cutting materials such as wood and metal.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a rear view of the dual band saw cutting machine showing the components within the lower section, rear part, of the machine.

Similar reference characters denote corresponding features consistently throughout the attached drawings.

DETAILED DESCRIPTION OF THE PREFERRED EMBODIMENT

Figure 1:
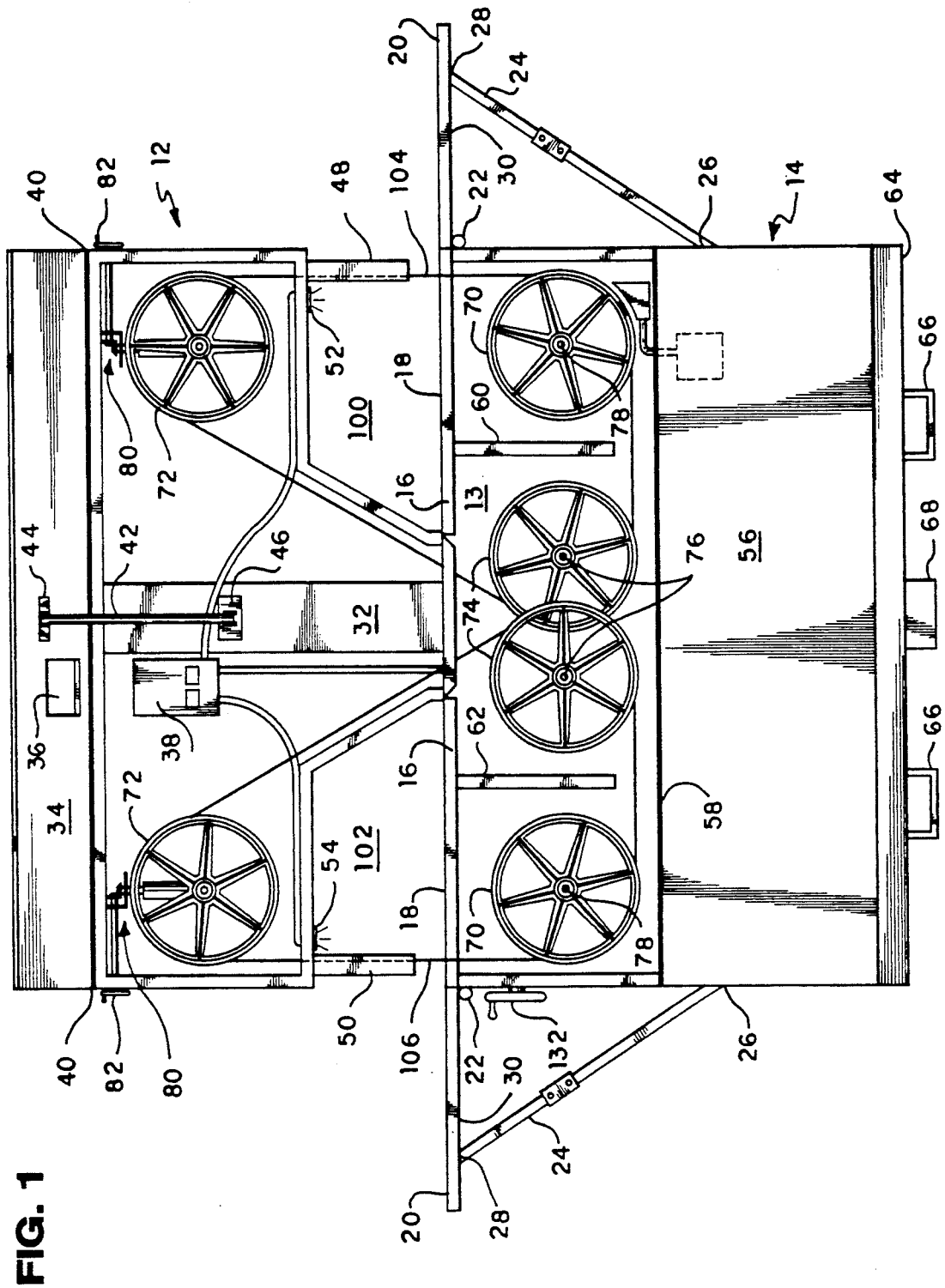
FIG. 1 is a front view of the dual band saw cutting machine wherein a front upper panel is raised and a front lower panel is lowered, revealing the components within the machine.

The present invention is a dual blade band saw cutting machine 10 capable of providing two safe, independent, work stations 100 and 102, each having its own cutting band 104 and 106, both cutting bands 104 and 106 being driven from the same, single power source Referring now to the drawings, FIG. 1 presents a frontal view of the cutting machine housing 10 having a distinct upper section 12 and a distinct lower section 14 separated by a table 16 having an upper horizontal working surface 18. Attached to the sides of machine housing 10 are two identical foldable extensions 20, 20 connected to the joint at the union of table 16 and lower section 14 of housing 10 by piano hinges 22, 22. Foldable extensions 20, 20 are further supported by hinged arm members 24, 24 having ends 26, 26 and 28, 28. Ends 26 of hinged arm 24 are pivotally attached to lower section 14 of housing 10, while ends 28 of hinged arm 24 are pivotally attached to the housing side 30, 30 of foldable extensions 20, 20.

Focusing now on upper section 12 of machine housing 10, support strut 32 adds additional stability to upper section 12. Upper section 12 is covered by upper front panel 34 having an opening 36 therein for accessing power control box 38. Upper front panel 34 pivotally connects to upper section 12 at corners 40, 40. Upper front panel 12 is further supported in an open position by front panel support arm 42 pivotally connected thereto by hinge assembly 44, and removably engages support strut 32 at connector assembly 46. Extending downwardly from upper section 12 into work stations 100 and 102 are cutting band guides 48 and 50 respectively. Lights 52 and 54 illuminate work stations 100 and 102, respectively.

Lower Section 14, including dividing wall 13 and lateral angled support braces 60 and 62 supports table 16. Lower section 14 is accessed from the front by lower front panel 56 hingedly attached to said lower section 14 by piano-type hinge 58. A bottom surface 64 of lower section 14 has three ground engaging members 66, 66, and 68. Ground engaging members 66 are run front to back across bottom surface 64 of lower section 14 and are seen as being hollow so that they may accept the arms of a fork lift (not shown) to facilitate moving of machine housing 10.

Housed within both upper section 12 and lower section 14 are cutting bands 104 and 106 which move in triangular rotational patterns, defining two planes which over lap one another in order to maximize the size of work stations 100 and 102, while keeping the size of machine housing 10 to a minimum. Three guide wheels make-up each triangular rotational pattern. These guide wheels comprise drive wheels 70, 70, adjustment wheels 72, 72, and idler wheels 74, 74. Again, since one of the main objectives is to provide large work stations 100 and 102 in a small machine housing 10, the above mentioned triangular rotational pattern is arranged in a right triangle configuration. In this particular configuration, drive wheels 70, 70 as well as idler wheels 74, 74 are rotatably secured within lower section 14 to lower section wall 13 by axle assemblies 76, 76, 78, 78. Adjustment wheels 72, 72 are located in upper section 12 of housing 10 and may be manually adjusted up and down by cranks 82, 82 of gear assemblies 80, 80.

Figure 2:
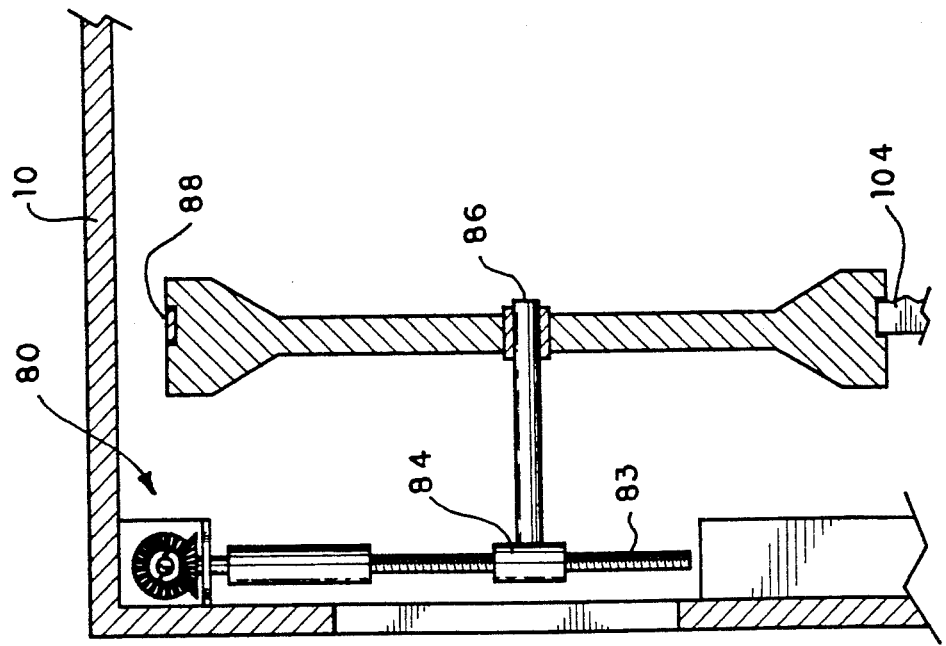
FIG. 2 is a cross sectional detail view of the upper section of the cutting machine showing the adjustment guide wheel as well as the gear assembly for adjusting same.

Referring now to FIG. 2, a gear assembly 80 is clearly presented. Extending from threaded collar 84 which engages and is supported by matingly threaded rod 83, is axle 86 which support adjustment wheels 72. Channel 88, common to all guide wheels is further illustrated in FIG. 2. Channels 88 provide additional support for stabilizing cutting bands 104 and 106 within all of the guide wheels 70, 70, 72, 72, 74, and 74. Channels 88 are further seen as being offset towards the forward facing portion of guide wheels 70, 70, 72, 72, 74, and 74. In addition, channels 88 may accept and support cutting bands having a width from one quarter inch up to and including one half inch, regardless of cutting tooth size.

Referring ahead to FIG. 4, which shows the rear view of machine housing 10, the rear portion of upper section 12 is seen as having horizontal storage tray 90 and pegs 92, 92, 92, and 92 for supporting and hanging additional saw blades. Lower section 14 as seen from the rear has a single power source, this being a variable speed motor 110, supported therewithin by adjustment bolts 112, 112, 112, and 112, aft of lower section wall 13. Extending through lower section wall 13 are guide wheel axles 76, 76, 78, and 78. Supported on the rear extending portions of axles 78 and 78 are transfer pulleys 114 and 115. Variable speed motor 110 has power pulleys 116, 116 extending from output shaft 117 which drive belts 118 and 120, which in turn drive transfer pulleys 114 and 115. Due to the oblong configuration of belt 118 and the crossed configuration of belt 120, which is additionally supported by support pulley 122, transfer pulleys 114 and 115 are driven in opposite directions; i.e., transfer pulley 114 rotates counterclockwise as viewed from the rear while transfer pulley 115 is rotated in a clockwise direction. It is this opposite direction driving that allows cutting bands 104 and 106 to move downwardly from adjustment wheels 72, 72 to across drive wheels 70, 70 through work stations 100 and 102 respectively.

A combination chain and shaft assembly 130 is provided so that variable speed motor 110 may be adjusted through its full output range of 300 blade feet per minute up to and including 2900 blade feet per minute. This assembly is adjusted by a crank 132 which engages lower section 14 on the outer surface thereof. Crank 132 is connected to chain 134 which rotates shaft 136 of assembly 130. Chain 134 may be mounted to the inner or outer surface of lower section 14 for purposes of safety and accessibility to the chain. In a first embodiment, chain 134 is supported within lower section 14, and, as shaft 136 passes through lower section 14, it is supported by shaft supports 138 and 138. In a second embodiment (not shown), chain 134 is supported on the outside of lower section 14 and shaft 136 passes from engine 110 through lower section 14, to the outside thereof, and accordingly does not require additional support therefor. Furthermore, shaft 136 is divided into two sections by a universal joint 140 which allows chain and shaft assembly 130 to remain fully functional should variable speed motor 110 be vertically adjusted via adjustment bolts 112, 112, 112, and 112 to provide the proper tension of belts 118 and 120.

Figure 3:
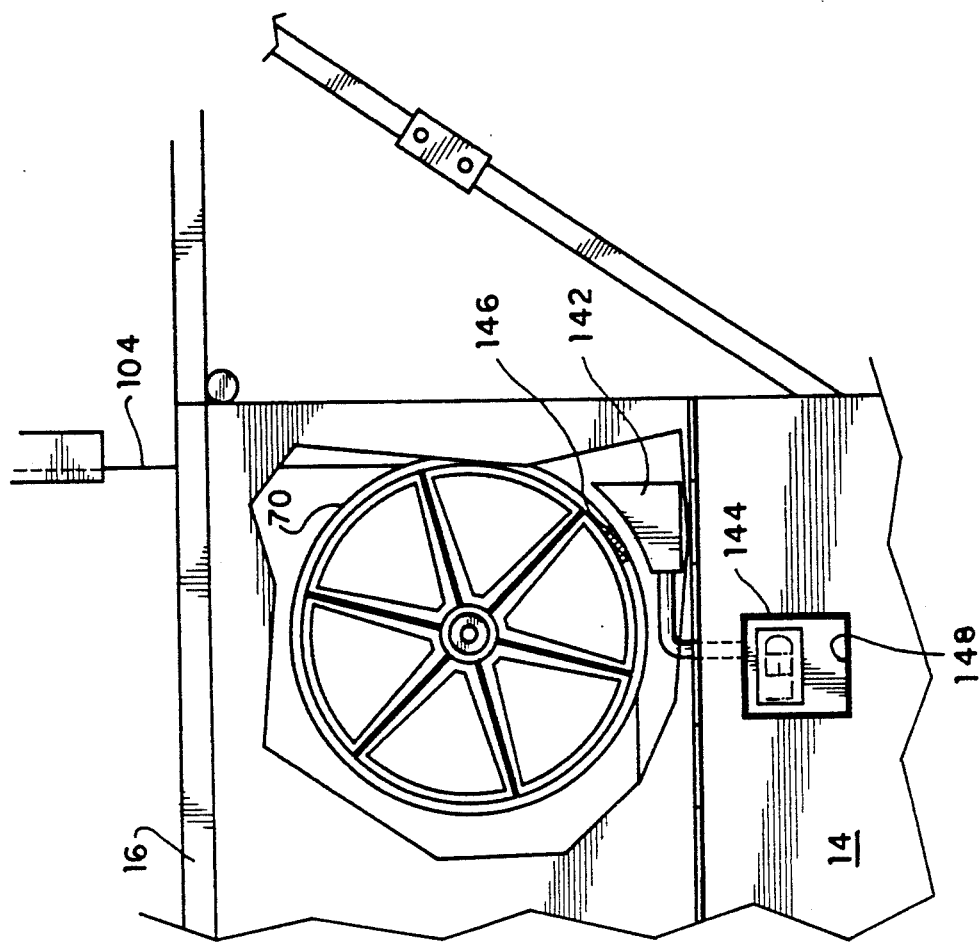
FIG. 3 is a detail view of the machine, with part of the lower front panel cut away, thus illustrating the magnetic counter and L.E.D. display for reporting cutting band speed.

The detecting and display means 142 and 144, respectively, for determining and displaying the speed of cutting bands 104 and 106 is illustrated in FIG. 3. Since both cutting bands are being rotated by the same variable speed motor 110, the circumferences of power pulleys 116 and 116 are equal, and the circumferences of transfer pulleys 114 and 115 are also equal, so only one detecting and display means is necessary. A magnetically responsive element 146 is placed on drive wheel 70, which is responsible for moving cutting band 104. As drive wheel 70 is rotated, as described hereinabove, the detector 142 monitors the speed thereof and converts this data so that the speed of cutting band 104 will be reported in blade feet per minute. This data is reported to an operator through a well-known L.E.D. type display 144 which is in electrical communication with detector unit 142. Both detector 142 and display 144 are mounted to lower section 14. The display 144 is viewable through opening 148 of housing lower section 14.

It is to be understood that the present invention is not limited to the sole embodiment described above, but encompasses any and all embodiments within the scope of the following claims.

I claim:
1. A cutting machine comprising:
   a housing supporting a table having an upwardly facing horizontal working surface;
   a power source supported and located within said housing;
   a plurality of work stations, each of said work stations comprising a plurality of guide wheels rotatably supporting a flexible, continuous cutting band, said plurality of guide wheels comprising, for each of said cutting bands, a drive wheel, an adjustment wheel, and an idler wheel, thus describing a triangular rotation pattern, at least one of said drive wheel, said adjustment wheel, and said idler wheel being located in said housing above said working surface and at least one other of said drive wheel, said adjustment wheel, and said idler wheel being located in said housing below said working surface, each of said work stations being configured such that a respective cutting band projects from said housing above said table working surface and is received into said table and is exposed to a user, thereby to enable work to be manipulated therearound and thus to be cut thereby, whereby a number of independent cutting operations corresponding to the number of work stations is enabled;
   said power source is adjustably supported within said housing by a plurality of adjustment bolts, and includes a variable speed motor and a plurality of drive belts powering said drive wheels, manual positioning control means mounted on said housing and mechanically connected to said power source by linkage including a shaft for adjusting said motor, said shaft employing a universal joint therealong so that all connections of said linkage reaming operable should said power source be adjusted when tensioning the drive belts used to transfer rotational power from said motor to said drive wheel of said triangular rotation patterns.

2. The cutting machine according to claim 1, said power source including a plurality of power pulleys having a common rotational axis and a plurality of transfer pulleys, each of said transfer pulleys having a common rotational axis with one of said drive wheels, each of said drive belts extending around on of said power pulleys and one of said transfer pulleys, wherein at least one of said drive belts describes an oblong loop and at least one other of said drive belts describes a crossed loop, wherein a first set of said guide wheels are located on one side of said power, pulleys and a second set of said guide wheels are located on a second side of said power pulleys, opposite said first side.

3. The cutting machine according to claim 2, including detecting and display means for monitoring and reporting the speed of said continuous, flexible, cutting bands comprising:
   a magnetically responsive element attached to said drive wheel driven by said belt of oblong loop configuration from said power source;
   detecting means for detecting the rotational frequency of said magnetically responsive element and further including means for converting said detecting rotational frequency from rotations per minute to feet per minute; and
   an electronic L.E.D. display device in electronic communication with said detecting means for displaying the speed of the cutting bands.

4. The cutting machine according to claim 1, said housing being configured to define a lower section and an upper section, said table supported on said housing an demarcating said upper and lower sections, and each of said cutting bands projecting from said housing upper section to said working surface.

5. The cutting machine according to claim 4, said table having foldable extensions positionable in horizontal and vertical configuration, each said foldable extension being hingedly attached to said table and said lower section being additionally supported by hinged arm members, said hinged arm members having two distinct ends, a first end of said two distinct ends being pivotally attached to said foldable extension and a second end of said two distinct ends being pivotally attached to said lower section, thereby creating a larger horizontal work surface when any one of said foldable extensions is positioned in said horizontal configuration.

6. The cutting machine according to claim 4, including a plurality of ground engaging members incorporated into said lower section of said housing, said ground engaging members extending across a bottom surface of said lower section and having a hollow, rectangular cross section, whereby said ground engaging members may receive a fork lift therewithin for ease of movement of said cutting machine.

7. The cutting machine according to claim 4, including lights positioned within said upper section for illuminating said horizontal work surface.

8. The cutting machine according to claim 4, wherein said upper section of said housing has a rear face, said rear face having a horizontal tray and a plurality of pegs for securing and storing spare cutting blades.

9. The cutting machine according to claim 1, further comprising plural mechanical adjustment means, each of said triangular rotational patterns being selectively adjustable so as to increase and decrease tension of said, continuous, flexible, cutting bands by said mechanical adjustment means, each one of said mechanical adjustment means being capable of vertically displacing one of said adjustment wheels.

10. The cutting machine according to claim 1, wherein each of said guide wheels has a channel positioned about the circumference thereof, for securing said continuous, flexible, cutting bands therewithin, said channels being slightly offset forward of a plane centrally bisecting the thickness of said guide wheels.

11. The cutting machine according to claim 1, wherein said continuous, flexible, cutting bands have a predetermined width dimension ranging between one quarter inch (six mm) and one half inch (thirteen mm).

12. The cutting machine according to claim 1, wherein said variable speed motor is configured to move said continuous, flexible, cutting bands at any predetermined rate, ranging from 300 feet (90 meters) per minute to 2900 feet (900 meters) per minute.

* * * * *